United States Patent [19]
Waggener
[11] 3,908,115
[45] Sept. 23, 1975

[54] ADAPTIVELY TUNED DATA RECEIVER

[75] Inventor: William N. Waggener, Sarasota, Fla.
[73] Assignee: Weston Instruments, Inc., Newark, N.J.

[22] Filed: Oct. 7, 1974
[21] Appl. No.: 512,990

[52] U.S. Cl. ................ 235/152; 325/323; 325/473; 333/18
[51] Int. Cl.² ............................................ H04B 1/10
[58] Field of Search ........ 235/152, 193; 325/42, 65, 325/320, 323, 324, 472, 473; 333/18, 28 R, 70 R, 70 T; 178/69.5 DC; 328/165, 167; 307/221 C, 221 D

[56] References Cited
UNITED STATES PATENTS

| | | | |
|---|---|---|---|
| 3,518,547 | 6/1970 | Filipowsky | 325/42 |
| 3,694,752 | 9/1972 | Gibson | 325/323 |
| 3,736,530 | 5/1973 | MacLean | 325/65 X |
| 3,846,708 | 11/1974 | Franco | 325/323 X |

*Primary Examiner*—Joseph F. Ruggiero
*Attorney, Agent, or Firm*—William R. Sherman; Kevin McMahon; I. S. Kavrukov

[57] ABSTRACT

A data receiver has a digital filter which is adaptively tuned to the instantaneous bit-rate of a received noisy digital signal so as to provide an optimum transfer function despite irregularities in the received signal. A timing signal which reflects the true rate of the received signal adaptively tunes the filter, and sets the bit-rate at which the filter output is digitized. The data receiver output is a digital signal which is a reconstruction of the information content of the received digital signal with low probability of error.

20 Claims, 2 Drawing Figures

ADAPTIVELY TUNED DATA RECEIVER

BACKGROUND OF THE INVENTION

This invention relates to systems for reconstructing noisy digital signals, and relates specifically to an adaptively tuned data receiver.

One known approach to reconstructing a noisy digital signal is to first pass the signal through a tuned filter. Prior art filters use fixed-tuned circuits to achieve the desired filter characteristics. The problem with this is that the filter is properly tuned at only one preset transmission rate. When the actual transmission rate differs from this preset rate, the prior art filter is no longer properly tuned and system performance is degraded.

For example, there is a prior art filter for the non-return to zero (NRZ) pulse code modulation (PCM) signal, which filter is based on a synthesized transfer function in which each received PCM bit must be delayed by a one-bit interval. This delay is provided by a fixed-tuned network, which is capable of providing an accurate one-bit delay at only one data transmission rate. If the transmitted data rate varies, as may be the case when the transmitter is sending out PCM data recorded on tape, the actual bit-duration interval will vary from the fixed interval provided by the fixed-tuned network. The prior art filter will then no longer provide the desired one bit delay, and its performance will be degraded as compared to an optimally tuned filter.

In addition to applying a transfer function to the received digital signal for the purpose of reducing the effect of noise, prior art filters require a clock pulse train to be extracted from the received digital signal by an additional network used specifically for this purpose, thus increasing system cost and complexity.

If it is desired to receive data at different transmission frequencies, a different prior art fixed-tuned filter must be switched in for each new transmission frequency, thus further increasing the cost and complexity of receivers employing such prior art filters.

SUMMARY OF THE INVENTION

The invention is in the field of data receiving systems, and relates specifically to an adaptively tuned data receiver for reconstructing noisy digital signals.

An object of the invention is to provide a system for reconstructing a received noisy digital signal with low probability of error.

A further object of the invention is to provide a system capable of maintaining an optimum matched filter characteristic despite variations in the transmission rate of the received digital signal.

Still another object is to provide a system capable of use at different transmission rates without employing multiple filters and switching circuits.

Yet another object is to extract a timing signal from the received digital signal without the use of a separate circuit used only for this purpose.

To these and other ends the present invention provides a receiver with a matched-filter having an analog delay line which is electronically tunable to the instantaneous bit-rate of the received digital signal. A timing signal which reflects the true, instantaneous bit-rate of the received digital signal is used to adaptively tune the matched filter to the current rate of the received digital signal and to thereby obtain an optimum matched-filter characteristic, and is additionally used to control the rate at which the output of the tuned matched filter is digitized to reconstruct the information content of the received digital signal.

In an illustrative embodiment of the invention, a received NRZ PCM digital signal is first passed through a matched filter having the desired transfer function and containing a tunable delay line. The filter output is then fed to a timing network which generates a timing signal at a rate which is a function of the rate and of rate variations of the received digital signal. The timing signal is fed back to the tunable delay line in the matched filter to adaptively tune the filter to the desired one-bit delay at the current rate of the received signal, to thereby maintain an optimum matched-filter characteristic despite rate variations in the received signal. The timing signal is additionally used to digitize the output of the tuned matched filter at the desired bit-rate in order to generate an output digital signal which is a reconstructed replica of the transmitted digital signal. The timing signal and the output digital signal are combined to jointly contribute to controlling the rate of the timing signal.

The invented system therefore offers the advantage of automatically providing an optimum matched-filter characteristic despite variations in the transmission rate of the received digital signal, and the advantage of reconstructing the received noisy digital with low probability of error. Since an optimum filter characteristic is automatically achieved at the actual transmission rate, the invented system offers the additional advantage of being capable of receiving signals at different transmission rates without the need for multiple filters and switching circuits. Simplicity is achieved by using the same circuits to generate both a timing signal to reconstruct the received digital signal and a control signal to tune the matched filter.

DETAILED DESCRIPTION

A noisy NRZ PCM input digital signal from an external data transmitter (not shown) is received at the input terminals of the invented receiver. This signal may contain undesired amplitude variations of substantial magnitude, and may also exhibit short or long-term variations in bit-rate which may further complicate the task of reconstructing the original signal. In accordance with the invention, undesirable amplitude variations in the received digital signal are minimized by a matched filter which is adaptively tuned to the current bit-rate of the received signal. The output from this matched filter is then digitized to generate an output digital signal which is a "clean" reconstruction of the received noisy signal. The bit-rate of this reconstructed signal is established by a timing signal which reflects the desired, true bit-rate from the received digital signal. Additionally, the same timing signal adaptively tunes the matched filter to obtain the optimum filtering characteristic. The output digital signal is a replica of the transmitted and received digital signal, reconstructed with a low probability of error due to the consistently maintained optimum tuning of the matched filter.

Figure 1:
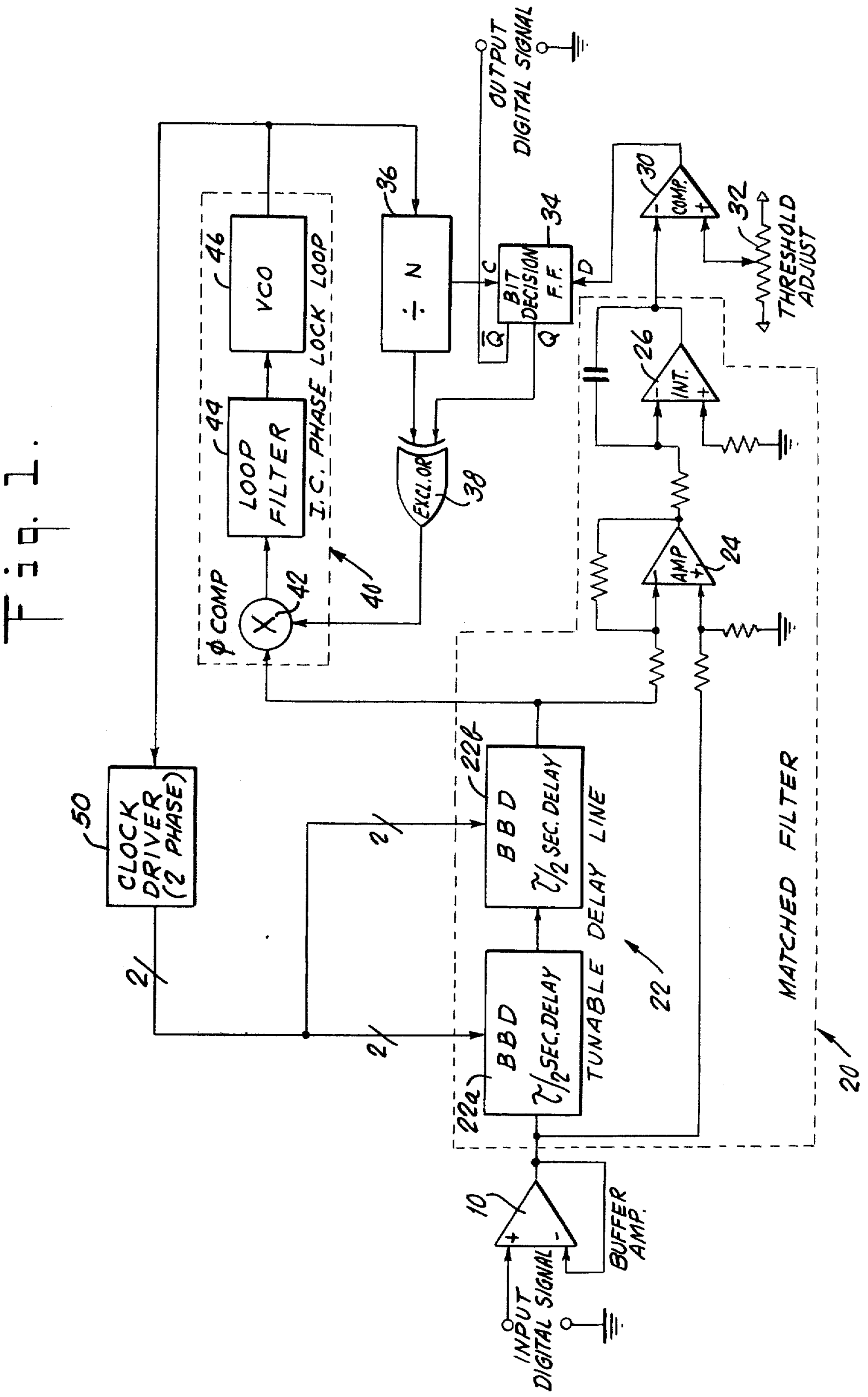
FIG. 1 is a block diagram of an adaptively tuned receiver embodying the invention.

Referring to the specific embodiment of FIG. 1, a received noisy input digital signal is applied to a matched filter 20 through a buffer amplifier 10. The purpose of the matched filter is to realize an optimum transfer function for the type of digital modulation contained in the received signal. The configuration of matched filter 20 shown in FIG. 1 implements the transfer function associated with an optimum matched filter for the NRZ PCM code. Alternatively, matched filter 20 may be configured to realize the optimum matched filter transfer function for other modulation schemes, such as return to zero (RZ), biphase of delay modulation, and still act in accordance with the invention.

Matched filter 20 comprises a tunable delay line 22, an analog summing amplifier 24 and an integrator 26. The received input digital signal is delayed by a one-bit interval in tunable analog delay line 22. In the disclosed embodiment this delay line comprises two charge transfer devices, each providing a one-half bit delay interval. These charge transfer devices are shown as bucket brigade devices (BBD) 22*a* and 22*b* in FIG. 1, and may be of the type described in Sangster and Teer, Bucket Brigade Electronics — New Possibilities for Delay, Time-Axis Conversion and Scanning, *IEEE Journal of Solid-State Circuits*, Vol. SC-4, No. 3, June 1969, and Sangster, Integrated MOS and Bipolar Analog Delay Lines Using Bucket-Brigade Capacitor Storage, IEEE International Solid-State Circuits Conference Digest of Technical Papers, 1970. Alternately, the delay line 22 may comprise one or more charge coupled devices operated as an analog delay line.

The input digital signal and the delayed signal at the output of tunable delay line 22 are combined in analog summing amplifier 24 and then integrated in integrator 26. The output of integrator 26 represents the received digital signal after filtering.

Figure 2:
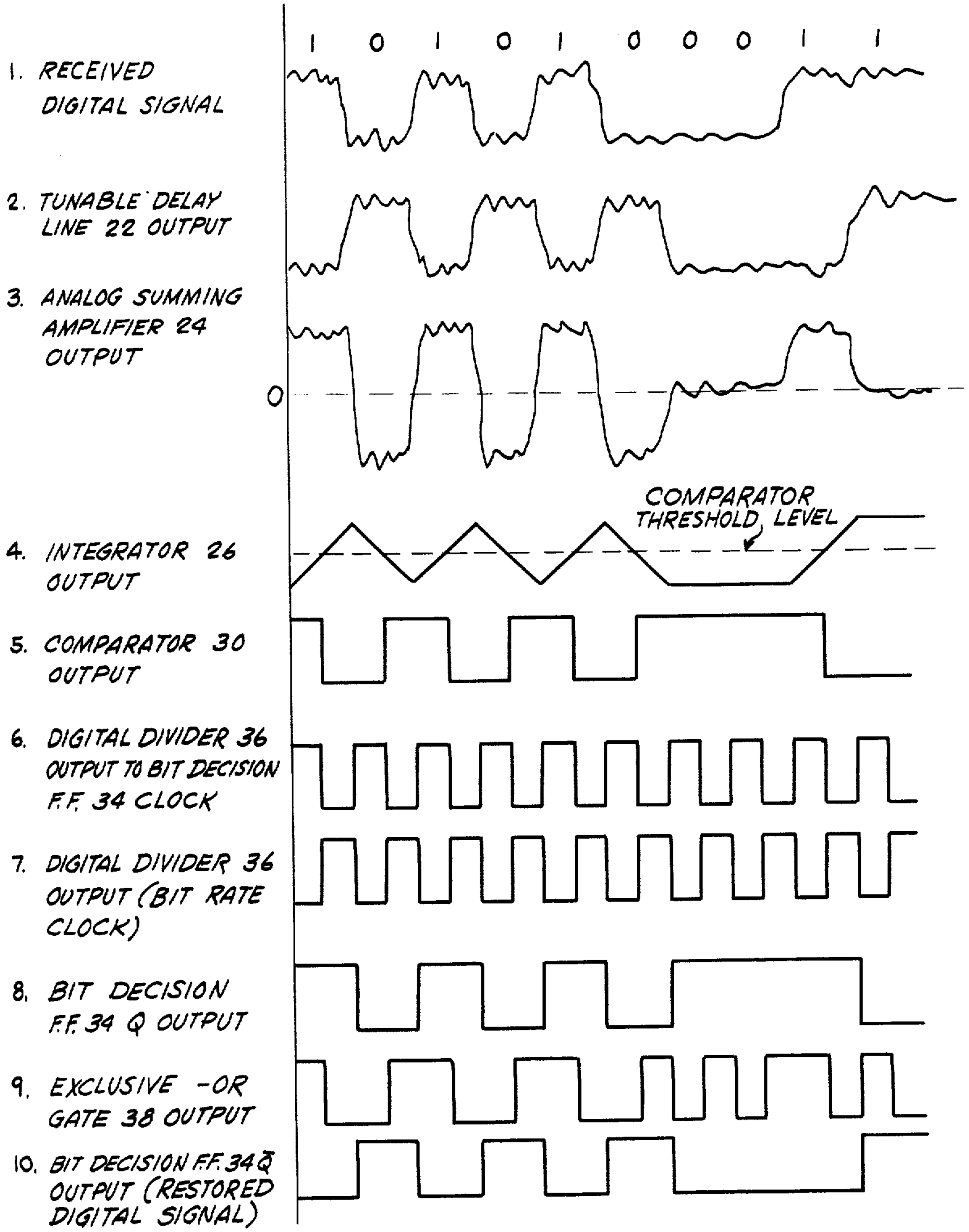
FIG. 2 is a timing diagram of typical waveforms associated with the receiver of FIG. 1.

The operation of matched filter 20 is illustrated in the timing diagram of FIG. 2, at lines 1–4. A portion of an input digital signal, such as might appear at the input of matched filter 20, is shown at line 1. A signal in which the bit levels are visually intelligible is shown for clarity, although the system is capable of reconstructing signals which are so degraded as to be unintelligible by simple observation of the waveform. This waveform is passed through bucket brigade devices 22*a* and 22*b* of tunable delay line 22 to generate the delayed output shown at line 2. The waveforms of lines 1 and 2 are then combined in analog summing amplifier 24 to produce the analog summing amplifier output shown at line 3. This waveform is then integrated in integrator 26 to produce the waveform shown at line 4, which is the output of matched filter 20.

The output of the matched filter 20 is compared with a fixed threshold level in a comparator 30. If the matched filter 20 output is above a level determined by the setting of a threshold adjust potentiometer 32, a first output level is generated, while if the matched filter 20 output is below the threshold, a second level appears at the output of comparator 30, a shown at line 5 of FIG. 2. The two levels at the output of comparator 30 correspond to the two states of the received digital signal, but the time at which this waveform switches from one state to another is a function of the comparator threshold level, shown as a dotted line at line 4 of FIG. 2. The output of comparator 30 is thus not an accurate reproduction of the received digital signal because its changes in state are not in synchronism with the received digital signal. In order to fully reconstruct the information content of the input digital signal, proper timing must be introduced.

This is done with the help of a bit decision flip-flop 34, which receives the output from comparator 30 at its D input, and is leading-edge triggered at its clock input C by a timing signal at the desired bit-rate. This timing signal, which is generated as described below, is shown at line 6 of FIG. 2. When bit decision flip-flop 34 is triggered by the leading edge of the timing signal, at the end of the corresponding bit of the input digital signal, it makes a bit-decision by sampling the output of comparator 30 and transferring this sample level to its output. The Q output of bit-decision flip-flop 34 is therefore an accurate reconstruction of the information content of the input digital signal, since the bit level information obtained from comparator 30 and matched filter 20 has not been synchronized with the input digital signal by the timing signal, but this Q output of flip-flop 34 is, as illustrated at line 10 of FIG. 2, delayed by a one-bit interval with respect to the input digital signal.

As discussed above, it is necessary to generate the proper timing signal in order to synchronize the output of the bit-decision flip-flop 34 with the input digital signal and to keep the delay line 22 properly tuned. This timing signal is generated in a timing network containing a conventional integrated circuit phase-lock loop. This phase-lock loop receives signals representing the input digital signal and the combination of its own output with the output digital signal, and generates a timing signal output which is a function of the phase relationship between these signals. The output of the phase-lock loop is fed back to the tunable delay line 22 of the matched filter 20 to tune it such that it keeps delaying each bit of the input signal by the duration of that bit, regardless of variations in the bit-rate of the input digital signal. Additionally, the output of the phase-lock loop is time-divided down to the bit-rate of the input digital signal to synchronize the output digital signal with the input digital signal. Still additionally, this time-divided output from the phase-lock loop 40 is combined with the output digital signal (by an exclusive-OR gate) for feedback to the phase-lock loop.

The disclosed receiver thus employs a decision-directed technique whereby the timing network containing the phase-lock loop circuit is controlled as a function of the input and the otuput digital signal to maintain bit-rate synchronism with the received digital signal. Furthermore, a signal from the timing network is used to adaptively tune the tunable delay line in order to ensure that the matched filter effects an optimum transfer function at the true bit-rate of the received digital signal.

Specifically, referring to FIG. 1, synchronism between the input digital signal and the output digital signal is maintained with the help of the phase-lock loop 40 which contains a phase comparator 42, a loop filter 44, and a voltage controlled oscillator (VCO) 48. Phase comparator 42 receives input signals from tunable delay line 22 (representing the phase of the input digital signal) and from an exclusive-OR gate 38 (representing the phase of the exclusive-OR combination of the output digital signal with the output of the loop 40). The output of phase comparator 42 is a function of the phase difference between the input digital signal and the output digital signal, and additionally reflects the output of the loop 40. This output of the phase comparator 42 is filtered by loop filter 44 and used to control VCO 46. When there is phase-lock, VCO 46 runs at a rate which is an integral multiple of the bit-rate of the input digital signal. This multiple is selected to provide a suitable signal for controlling tunable delay line 22 to delay each bit of the input signal by its duration. As shown, the output signal from VCO 46 controls a two-phase clock driver 50, which in turn generates a two-phase signal which tunes bucket brigade devices 22*a* and 22*b* in tunable delay line 22. Tunable delay line 22 therefore maintains a one-bit delay at the true, current, bit-rate of the received digital signal.

The output from VCO 46 also drives a digital divider 36 which serves to divide the output of VCO 46 down to the bit-rate of the received digital signal. In the embodiment of FIG. 1, VCO 46 is operated at a bit-rate of 32 times the bit-rate of the received digital signal to provide a suitable control signal for tuning delay line 22. Digital divider 36 (which may be a modulo-32 counter) divides the VCO output by 32 to obtain a clock signal at the desired bit-rate. A first output of digital divider 36 provides the timing signal to the clock input of bit decision flip-flop 34 for properly timing the rate of the output digital signal, as discussed above. This timing signal is shown at line 6 of FIG. 2. A second output of digital divider 36, shown at line 7 of FIG. 2, is fed to exclusive-OR gate 38, along with the Q output of bit decision flip-flop 34 shown on line 8 of FIG. 2. In this manner the bit decision made in flip-flop 34 is used to steer the phase of the divided clock signal from digital divider 36. This establishes the proper phase relationship to permit the phase of the output of exclusive-OR gate 38 to be compared with the phase of the output of tunable delay line 22 in phase comparator 42. The output of exclusive-OR gate 38 is shown in FIG. 2, at line 9.

To summarize, when an input digital signal of constant bit-rate is being received, the system is in phase-lock. Tunable delay line 22 is optimally tuned by a timing signal from VCO 46, and a timing signal from digital divider 36 enables bit decision flip-flop 34 to generate an output digital signal in synchronism with the true bit-rate of the input digital signal. If the bit-rate of the received input digital signal changes, this change is detected in phase-lock loop 40, resulting in a change in the rate of the timing signal from VCO 46. This in turn causes tunable delay line 22 to be optimally retuned for the new bit-rate, and causes the bit decision flip-flop 34 to maintain synchronism with the new bit-rate of the input digital signal.

Specifically, if the bit-rate of the input digital signal increases, phase comparator 42 detects this increase as an increasing phase error, and generates an increasing error signal. This error signal is averaged in loop filter 44 to generate a signal to control the frequency of VCO 46. An increase in amplitude at the input of VCO 46, corresponding to an increase in the bit-rate of the input digital signal, results in an increase in frequency at the output of VCO 46. This increase in output frequency causes tunable delay line 22 to be retuned to the new, higher bit-rate of the input digital signal. Since the output of VCO 46 is also fed to digital divider 36, the new, higher rate of the digital divider output increases as the VCO output frequency increases, causing the output of matched filter 20 to be digitized at the new, higher bit-rate. Similarly, if the bit-rate of the input digital signal decreases, this change is detected in phase comparator 42 and a signal of decreasing amplitude appears at the input of VCO 46. This results in a decrease in frequency at the output of VCO 46, which causes tunable delay line 22 to operate at the new, lower bit-rate, and the output of matched filter 20 to be digitized at the same new, lower bit-rate.

Thus, for either an increase or decrease in the bit-rate of the received input digital signal, an optimum filter characteristic is generated, and the received signal is reconstructed with low probability of error. Since the output of the matched filter is digitized at the desired bit-rate, the timing as well as the information content of the received digital signal are accurately reconstructed. Further, the invented receiver may receive at each of several transmission rates, without any change of components.

While bit-rate changes and one-bit delays have been discussed in detail, it should be clear that the invention is applicable to processing an input signal which is a train of symbols that may be other than bits.

I claim:

1. A receiver comprising:

a filter having a defined transfer function and including a delay line;

means for passing an input digital signal through the filter and the delay line to derive a filter output signal resulting from transforming the input signal in accordance with said transfer function;

means for deriving a timing signal reflecting the actual rate of the input signal;

means for maintaining the delay line tuned in accordance with said timing signal and thus in accordance with the actual rate of the input signal; and means for digitizing the filter output signal in accordance with said timing signal to derive an output digital signal.

2. A receiver as in claim 1 wherein the means for deriving a timing signal comprises means for comparing the rate of the input signal at the delay line with the rate of the output digital signal to derive a control signal reflecting the comparison, and means for generating said timing signal at a rate reflecting the value of the control signal.

3. A receiver as in claim 2 wherein the delay line comprises a charge-transfer device operated as an analog delay line and the maintaining means comprises means for clocking the charge-transfer device at a rate determined by the rate of the timing signal.

4. A receiver as in claim 2 wherein the delay line comprises a charge coupled device and the maintaining means comprises means for clocking the charge coupled device at a rate determined by the timing signal.

5. A receiver as in claim 2 wherein the input signal is a bit train and each bit thereof is delayed in the delay line by its duration.

6. A receiver as in claim 2 wherein the comparing means comprises a phase lock loop comparing the phase of the signal which is delayed with the phase of the output digital signal and the generating means comprise means for generating a timing signal which deviates from a preset rate by an amount reflecting the comparison.

7. A receiver as in claim 1 wherein the means for deriving a timing signal comprises means for comparing the input signal with an exclusive-OR function of the timing signal and the output signal.

8. A system comprising:

a filter having a defined transfer function and including a delay line;

means for passing an input digital signal through the filter and the delay line to derive a filter output signal resulting from transforming the input signal in accordance with said transfer function;

means for deriving a timing signal reflecting the actual rate of the input signal; and means for maintaining the delay line tuned in accordance with said timing signal.

9. A system as in claim 8 including means for digitizing the filter output signal at a rate determined by the rate of the timing signal to derive an output digital signal.

10. A system as in claim 9 wherein the means for deriving a timing signal comprises means for comparing the rate of the input signal with the rate of the output signal to derive a control signal reflecting the comparison and means for generating said timing signal at a rate reflecting the value of the control signal.

11. A system as in claim 9 wherein the means for deriving a timing signal comprises a phase lock loop comparing the phase of the input digital signal with the phase of the output digital signal to provide a loop output signal at a rate which is an integral multiple of that of the input digital signal, and means for time-dividing the loop output to derive the timing signal for maintaining the delay line tuned and for digitizing the filter output signal.

12. A system as in claim 9 wherein the means for deriving a timing signal includes means for deriving an exclusive OR function of the timing signal and of the output signal and comparing said exclusive-OR function with the input signal for modifying the timing signal in accordance with the comparison.

13. A receiver comprising:

a delay line delaying an input digital signal;

a nonlinear network for transforming the delayed digital signal;

a digitizer for digitizing the delayed and transformed input digital signal to provide an output digital signal;

means for generating a timing signal;

means for controlling the rate of the timing signal as a function of the phase comparison of the input digital signal and an exclusive OR function of the output digital signal and the timing signal; and means for maintaining the delay line tuned in accordance with the timing signal.

14. A method of processing an input digital signal comprising the steps of:

passing the input digital signal through a filter having a defined nonlinear transfer function and including a delay line to derive a filter output signal resulting from delaying the input signal in the delay line and transforming it in accordance with the transfer function;

deriving a timing signal reflecting the actual rate of the input signal;

maintaining the delay line tuned in accordance with the timing signal; and digitizing the filter output signal in accordance with the timing signal to derive an output digital signal.

15. A method as in claim 14 wherein the step of deriving a timing signal comprises the substeps of comparing the input signal with the output signal to derive a control signal reflecting the difference in the rates of the compared signals and generating the timing signal at a rate reflecting the value of the control signal.

16. A method as in claim 14 wherein the step of deriving the timing signal comprises deriving an exclusive-OR function of the timing signal and the output digital signal and comparing the phase of the exclusive OR function with that of the input signal to derive a control signal reflecting the comparison, and controlling the rate of the timing signal in accordance with said control signal.

17. A method of receiving an input digital signal comprising:

delaying the input signal by a delay line and transforming the delayed signal by a defined transfer function;

digitizing the transformed digital signal to provide an output digital signal;

generating a timing signal whose rate is controlled as a function of a phase comparison of the input digital signal and an exclusive-OR function of the output digital signal and the timing signal; and maintaining the delay line tuned in accordance with the timing signal.

18. A system receiving an input digital signal and comprising:

a matched filter having an element tunable to the bit-rate of the input digital signal, said filter receiving the input digital signal and providing a filter output signal reflecting a defined transfer function;

means for generating a control signal from the matched filter which is a function of the bit-rate of the input digital signal;

means for tuning the matched filter to the bit-rate of the input digital signal by applying the control signal to the tunable element of the matched filter;

means for generating a timing signal at the bit-rate of the input digital signal from the matched filter; and means for digitizing the output of the tuned matched filter at a rate determined by the timing signal.

19. A method of reconstructing a received noisy digital signal with a low probability of error, comprising the steps of:

filtering the noisy digital signal in a matched filter having an element tunable to the bit-rate of the noisy digital signal;

generating a control signal from the matched filter which is a function of the bit-rate of the noisy digital signal;

tuning the matched filter to the bit-rate of the noisy digital signal by applying the control signal to the tunable element of the matched filter;

generating a timing signal at the bit-rate of the noisy digital signal from the matched filter; and reconstructing the received digital signal by digitizing the output of the tuned matched filter at a rate determined by the timing signal.

20. A system including means for receiving a nosiy digital signal and for generating a reconstructed digital signal therefrom, comprising:

means including a phase lock loop for comparing the phase of the noisy digital signal and the phase of the reconstructed digital signal and for generating a control signal which is a function of the phase relationship of the of the compared signals;

means for applying the control signal to the means for receiving the noisy digital signal and for generating the reconstructed digital signal for tuning the last recited means in accordance with the value of the control signal;

means for generating a timing signal from the control signal; and means for synchronizing the bit-rate of the reconstructed digital signal with that of the received noisy digital signal as a function of the control signal.

* * * * *

UNITED STATES PATENT AND TRADEMARK OFFICE

CERTIFICATE OF CORRECTION

PATENT NO. : 3,908,115

DATED : September 23, 1975

INVENTOR(S) : William N. Waggener

It is certified that error appears in the above-identified patent and that said Letters Patent are hereby corrected as shown below:

Col. 3, line 57, "comparator 30, a", should read -- comparator 30, as --.

Col. 4, line 17, "has not", should read -- has now --.

Col. 5, line 11, delete the comma after the word "current".

Signed and Sealed this

*ninth* Day of *March 1976*

[SEAL]

*Attest:*

RUTH C. MASON
*Attesting Officer*

C. MARSHALL DANN
*Commissioner of Patents and Trademarks*